April 22, 1930. J. N. BARKER ET AL Re. 17,645
TOILET SEAT ACCESSORY
Original Filed Feb. 28, 1927
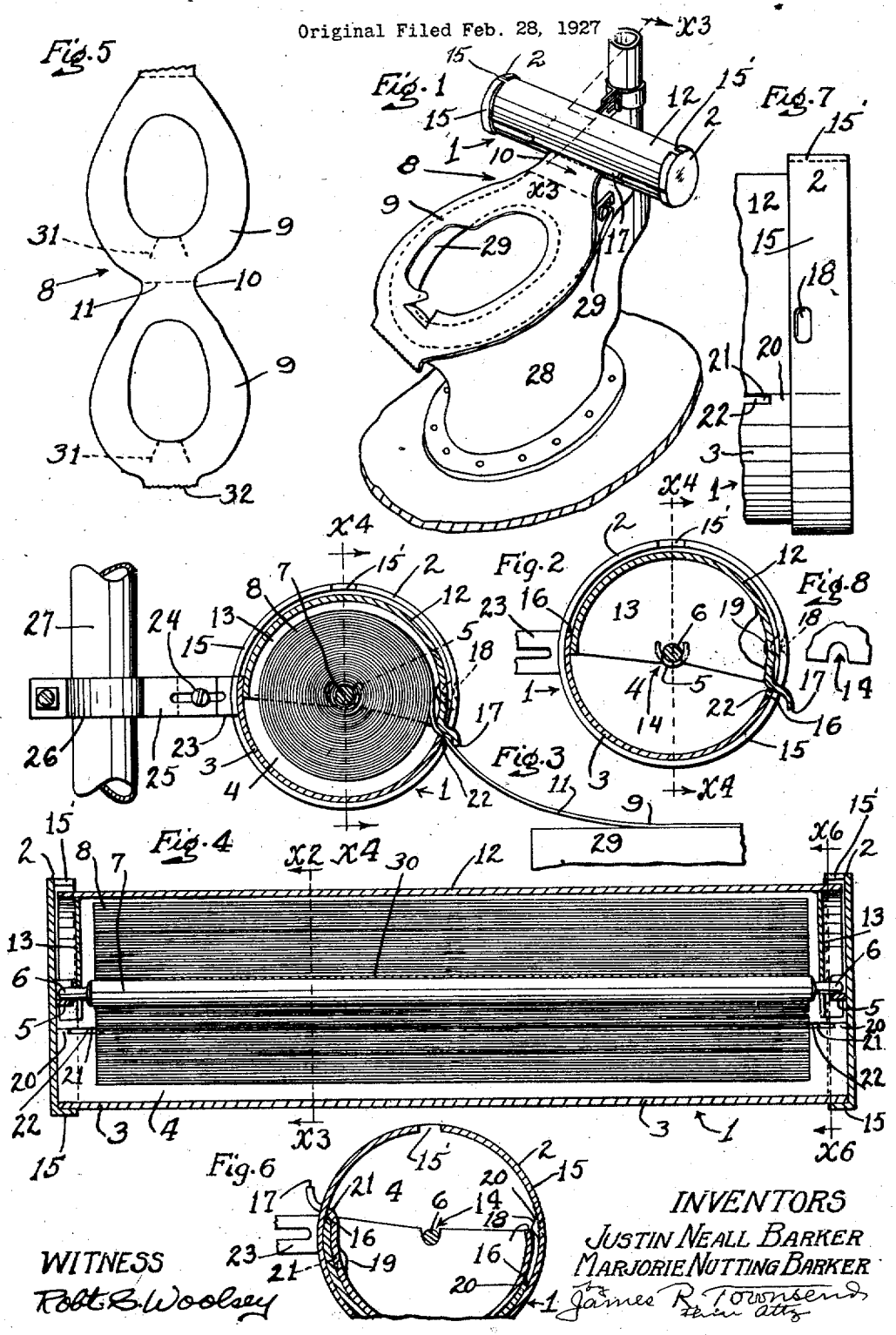

Reissued Apr. 22, 1930 Re. 17,645

UNITED STATES PATENT OFFICE

JUSTIN NEALL BARKER AND MARJORIE NUTTING BARKER, OF SANTA MONICA, CALIFORNIA

TOILET-SEAT ACCESSORY

Original No. 1,682,592, dated August 28, 1928, Serial No. 171,550, filed February 28, 1927. Application for reissue filed February 5, 1929. Serial No. 337,715.

An object of this invention is to provide convenient means for preventing the tops of toilet seats from becoming soiled and also to enable one intending to use a soiled toilet seat to do so without soiling himself or his clothing, or subjecting himself to liability of infection.

With a view to this end we have provided a toilet seat fixture or attachment adapted to dispense, one by one, a form of paper toilet seat covers connected by narrow perforated or otherwise easily severed necks that unite such covers in a roll-forming strip; and in said attachment we provide a roller for a roll into which such strip is wound, and provide for said roller and roll, a roll accommodating semi-housing having journal bearings in which the ends of the roller are journalled, and a semi-cylindrical roller cover for the semi-housing, said cover being adapted to be shifted to one position to complete the housing to enclose the roll on the roller, and to open the housing to give access to the roller to allow it to be withdrawn and to replenish the fixture.

An object is to facilitate detaching the individual seat covers from the strip and to insure that the one proposing to use a cover may be able to conveniently get hold of the end of the strip to pull out a fresh seat cover.

Another object is to make provision for easily opening the housing and for sufficiently securing the cover in closed position to allow the strip to be torn at the perforated necks without lifting the cover.

In carrying out the invention in its preferred form we make provision for a narrow slot between the forward edges of the housing and the cover when the cover is in closed position; and such edge of the cover is made to extend forwardly and downwardly and is adapted to allow the neck to be severed at the perforation line thereacross, some distance in front of the front edge of the housing, thus to leave a portion of the strip to project from the housing to afford sufficient length to be grasped for the purpose of unwinding the next seat cover.

Features of the invention reside in the construction and arrangement of the connection between the roller cover and the semi-housing.

The invention may be carried out in various ways.

Objects are simplicity and ease of construction, attachment, replenishing and use.

The invention may be embodied in various forms of construction and the accessory may be made of different materials such as strong sheet metal, castings or porcelain covered metal.

The accessory may be connected to and marketed with a toilet seat or may be marketed as an attachment for toilet seats and bowls, and will be illustrated as an attachment.

The seat cover strip may be of any suitable flexible and easily severable sheet material, and is preferably of thin tough paper that may be stretched over and be conformed to the seat surface without being easily ruptured, and said strip may be fastened at one end to and be wound on a pasteboard tube in a way well known in the art of making rolls of toilet paper, or may be otherwise made up.

Other objects, advantages and features of invention may appear from the accompanying drawing, the subjoined detailed description and the appended claims.

The accompanying drawing illustrates the invention.

Fig. 1 is a perspective view of our newly invented accessory in place on a toilet bowl seat with a protecting cover in place; a fragment of such cover is broken to expose a portion of the toilet seat.

Fig. 2 is a cross-section of the container omitting the roll and showing a fragment of an attachment for connection with a support; the section is on line indicated by $x^2$—$x^3$, Fig. 4.

Fig. 3 is a section analogous to that shown in Fig. 2, with a roll of paper protectors in place, and with fragments of the attachment support and the toilet seat with a paper protector thereon.

Fig. 4 is a vertical section on the line $x^4$, Figs. 2 and 3, with paper roll in place and the container closed.

Fig. 5 is a view of a fragment of the paper strip showing two of the seat covers connected to each other.

Fig. 6 is a fragmental cross-section on the line indicated at $x^6$, Fig. 4, omitting the roller and paper roll and showing the hollow semi-cylindrical roll cover turned to position to allow removal of the roller preparatory to placing a new roll thereon for replenishing the container.

Fig. 7 is an enlarged fragmental view of an end of the container closed and empty.

Fig. 8 is a fragmental detail to illustrate the bearing slot in the edge of the end webs of the cover.

The container is made up of a semi-housing 1 which consists of cylindrical caps 2 at the ends respectively of the housing, and a semi-cylindrical housing body 3, to which the caps 2 are fixed, providing a roll-accommodating open space 4 in the semi-housing. 5 indicates a fixed open top bearing projecting from the insides of the caps and adapted to receive the spindles 6 on the ends of a roller 7 adapted to support the strip 8 of paper seat covers 9, that are connected by necks 10 which are weak and may be further weakened by a line 11 which may be formed by perforations or scores so that the seat protecting portions of the strip may be conveniently detached from the strip one at a time as occasion may require. 12 is a hollow semi-cylindrical roll covering closure housed in the body between the caps 2 and provided with end webs 13, each of which is provided with a notch 14 adapted to ride upon the spindles 6.

The semi-cylindrical closure 12 is shown in closed position in Figs. 1, 2 and 3, and open in Fig. 6. The caps are provided with flanges 15 inside of which the semi-cylindrical cover or closure 12 is arranged, and conformed to the inside of the semi-cylindrical housing body 3 so that when the closure is swung around into the position shown in Fig. 6, it rests in the semi-cylindrical housing and the slot 14 is then uppermost so as to allow the roller to be withdrawn upward through the opening above the top edges 16 of said semi-cylindrical housing. The cap flanges 15 are provided with notches 15′ to allow withdrawal of the spindle 6.

The closure 12 terminates at its front in an overhang edge 17 and said cover and the caps are provided with complementary detents 18 and 19 that serve to retain the closure in closed position indicated in Figs. 2 and 3, where it is stopped by the stops 20 adapted to engage the upper front edge 21 of the body 3.

The strip outlet slot 22 through which the paper covers may be drawn is a long narrow recess or notch in the edge 21 beneath the overhang edge 17 which serves as a straight edge against which the user may draw the neck for the purpose of severing the same along the score 11 or across the neck 10 against which the neck may be drawn for the purpose of tearing it off.

The engagement of the detents 18 and 19 is sufficiently strong to allow the paper to be torn without moving the closure from its closed position.

The container may be connected to the seat, to the bowl, or to any suitable support by any suitable means, and is shown as provided with a slotted shank 23, adapted to be connected by a bolt 24 with a slotted support 25 that is secured by a clamp 26 on the flush pipe 27 of the toilet bowl 28. The clamp is adjustable up and down the flush pipe and the container is adjustable toward and from the seat and also up and down by pivotal movement on the bolt, and toward and from the pipe 27. The seat 29 may be of any well known character and may be hinged in any usual approved manner.

The container with its closure in place may be supplied with a paper strip roll 8, journalled on the roller 7, and said paper strip roll may be provided with a central cardboard tube 30 through which the roller 7 may be inserted and all that is necessary to supply the attachment with a roll of seat covers is to throw back the closure in the position shown in Fig. 6, then place the roll on a roller and insert both into the container, inserting the spindles in the opening bearings 5 and also in the journalled slots 14, and then to turn the closure into the position shown in Figs. 2 and 3, so that the roller spindles are held in place. The flanges of the caps serve to prevent removal of the closure.

When the closure is fully closed, as indicated in Figs. 2 and 3, the detents 18 and 19 engage, one within the other, with sufficient force to prevent the closure from being opened except by considerable upward pressure on the overhang 17, and the resistance of the catch formed by the detents is sufficient to allow the neck to be drawn against the overhang with sufficient force to tear off the used seat cover which can then be disposed of by placing it in the flush bowl and flushing it through the sewer, or it may be disposed of in any other available and desired way.

The end of the cover opposite the neck is shown provided with divergent scores 31 so that a flap 32 may be bent down against the inside of the seat, thus protecting against contact of the user with the immediate front of the seat.

The overhang 17 may be more or less extended beyond the front rim of the body 3 so that the neck will be torn a sufficient distance from the front of the container to afford a finger hold by which the remaining portion 32 of the neck may be grasped to draw out the next seat cover.

The overhang is preferably narrower than the slot and of about the width of the necks of the strip so that while it is serviceable as a cutter for the neck, it forms a convenient handle intermediate the ends of the front edge of the closure.

We claim as our invention:

1. A toilet seat accessory adapted to dispense, one by one, paper toilet seat covers connected by necks that unite such covers in a roll-forming strip: a roller for a roll of such strip; a semi-housing comprising end pieces having bearings open to receive and to release the journal ends of the roller, and adapted to support such journal ends; and a semi-cylindrical hollow closure adapted to be accommodated in the lower portion of such semi-housing, said closure having at the ends bearings adapted to be supported by the journal ends of the roller when the roller is in place and the closure is in closed position.

2. A toilet seat accessory adapted to dispense, one by one, paper toilet seat covers connected by necks that unite such covers in a roll-forming strip, a roller for a roll of such strip; a semi-housing comprising end pieces having bearings open to receive and to release the journal ends of the roller, and adapted to support such journal ends; and a semi-cylindrical hollow closure adapted to be accommodated in the lower portion of such semi-housing, said closure having at the ends bearings adapted to be supported by the journal ends of the roller when the roller is in place and the closure is in closed position; said semi-housing being provided with flanges to retain the closure and said flanges being provided with a notch through which the journals of the roller may be withdrawn when the closure is turned to open position.

3. A web container adapted to hold a roll of toilet seat covers wound upon a roller, said roller having end spindles, a closure to enclose the roll in the container, said container being provided with end caps having open bearing slots adapted to receive and support said spindles and a slot through which the seat covers may be withdrawn separately and said closure being rotatable on said spindles and provided with a lip against which the strip may be drawn to sever a withdrawn cover from the roll of covers, said lip projecting to form a handle for operating the closure.

4. A toilet seat accessory comprising: a semi-housing including end caps and a hollow semi-cylindrical body provided at one side with a notch; a hollow semi-cylindrical closure arranged between said caps and adapted to conform to said body when turned to open position, and adapted when closed to form in connection with the notched edge of said housing a slot through which a strip of paper may be drawn from a roll inside the housing when the closure is closed, the caps being provided with flanges; and interlocking detents on said flanges and closure respectively to hold the closure in closed position when a paper strip drawn through the slot is brought against the edge of the closure for the purpose of tearing it off.

5. A toilet seat accessory comprising: a semi-housing including end caps and a hollow semi-cylindrical body provided at one edge with a notch; a hollow semi-cylindrical closure arranged between said caps and adapted to conform to said body when turned to open position, and adapted when closed to form in connection with the notched edge of said housing a slot through which a strip of paper may be drawn from a roll inside the housing when the closure is closed, the caps being provided with flanges; and interlocking detents on said flanges and closure respectively to hold the closure in closed position when a paper strip drawn through the slot is brought against the edge of the closure for the purpose of tearing it off, said closure being provided with an overhang adapted to serve as a handle to move the closure and also adapted to serve as a cutter for said strip.

6. A toilet seat accessory comprising: a semi-cylindrical hollow body; flanged end caps for said body; upwardly opening bearings on said end caps; a roller having spindles in said bearings, said end caps being adapted to allow passage of the spindles for insertion and removal of the roller; and a semi-cylindrical hollow closure mounted in the housing and provided with open bearings adapted to rest upon the spindles when the closure is closed and adapted to release the spindles when the closure is open.

7. A toilet seat accessory of the character set forth in claim 1 in which the front edge of the semi-housing is notched and the front edge of the closure is adapted to stop on said front edge leaving the notch open to allow the strip to be drawn therethrough.

8. A toilet seat accessory of the character set forth in claim 1 in which the front edge of the semi-housing is notched and the front edge of the closure is adapted to stop on said front edge leaving the notch open to allow the strip to be drawn therethrough; the front edge of said closure being provided with an overhang that is narrower than the length of the slot and is adapted to act as a cutter for the necks of the strip.

In testimony whereof, we have hereunto subscribed our names at Santa Monica, California, this 22nd day of December, 1928.

JUSTIN NEALL BARKER.
MARJORIE NUTTING BARKER.